(12) United States Patent
Lang

(10) Patent No.: US 11,414,270 B2
(45) Date of Patent: Aug. 16, 2022

(54) SORTING CENTRE GOODS SORTING METHOD AND APPARATUS, AND GOODS SORTING SYSTEM

(71) Applicant: Beijing Jingdong Qianshi Technology Co., Ltd., Beijing (CN)

(72) Inventor: Yuanhui Lang, Beijing (CN)

(73) Assignee: Beijing Jingdong Qianshi Technology Co., Ltd., Beijing (CN)

( * ) Notice: Subject to any disclaimer, the term of this patent is extended or adjusted under 35 U.S.C. 154(b) by 52 days.

(21) Appl. No.: 16/771,106

(22) PCT Filed: Sep. 30, 2018

(86) PCT No.: PCT/CN2018/109121
§ 371 (c)(1),
(2) Date: Jun. 9, 2020

(87) PCT Pub. No.: WO2019/114381
PCT Pub. Date: Jun. 20, 2019

(65) Prior Publication Data
US 2020/0331698 A1    Oct. 22, 2020

(30) Foreign Application Priority Data
Dec. 12, 2017    (CN) .......................... 201711319500.1

(51) Int. Cl.
*B65G 1/04*    (2006.01)
*B07C 3/00*    (2006.01)
(Continued)

(52) U.S. Cl.
CPC ............ *B65G 1/0492* (2013.01); *B07C 3/005* (2013.01); *B07C 3/08* (2013.01); *B65G 1/137* (2013.01)

(58) Field of Classification Search
CPC combination set(s) only.
See application file for complete search history.

(56) References Cited

U.S. PATENT DOCUMENTS

| 3,573,748 A | 4/1971 | Holme |
| 5,348,288 A * | 9/1994 | Coombs ................. B65H 39/11 270/58.04 |

(Continued)

FOREIGN PATENT DOCUMENTS

| CN | 106681334 A | 5/2017 |
| CN | 107444825 A | 12/2017 |

(Continued)

OTHER PUBLICATIONS

International Search Report for PCT/CN2018/109121, dated Nov. 22, 2018, 2 pages.
(Continued)

*Primary Examiner* — Kyle O Logan
(74) *Attorney, Agent, or Firm* — Blank Rome LLP

(57) ABSTRACT

Disclosed are a sorting centre goods sorting method and apparatus, and a goods sorting system. The method may include: determining a current position of each first bag dropping opening included in the sorting center; using the current position of the each first bag dropping opening as each current cluster center; performing a clustering operation on each of bag dropping openings in the sorting center, using, in response to a position of an actual cluster center of each cluster corresponding to the current position of the each first bag dropping opening, the current position of the each first bag dropping opening as a final position of the each first bag dropping opening; and conveying the goods to the each of the bag dropping openings in the sorting center using the automated guided vehicle.

18 Claims, 7 Drawing Sheets

(51) Int. Cl.
　　*B07C 3/08*　　　　(2006.01)
　　*B65G 1/137*　　　(2006.01)

(56) References Cited

U.S. PATENT DOCUMENTS

| | | | |
|---|---|---|---|
| 2006/0151288 A1* | 7/2006 | Reznik | B65G 47/71 198/370.1 |
| 2011/0029127 A1* | 2/2011 | Stemmle | B07C 3/08 700/223 |
| 2017/0174432 A1 | 6/2017 | Zhu et al. | |
| 2017/0183158 A1* | 6/2017 | Zhu | G06Q 10/083 |
| 2020/0331698 A1* | 10/2020 | Lang | B07C 5/36 |

FOREIGN PATENT DOCUMENTS

| | | |
|---|---|---|
| EP | 2385435 A1 | 11/2011 |
| JP | 2016/113291 A | 6/2016 |

OTHER PUBLICATIONS

Supplementary European Search Report for EP 18887680, dated Jul. 16, 2021, 6 pgs.
Japanese Notice of Allowance for JP 2020-552077, dated Feb. 14, 2022, 3 pgs.

* cited by examiner

SORTING CENTRE GOODS SORTING METHOD AND APPARATUS, AND GOODS SORTING SYSTEM

CROSS-REFERENCE TO RELATED APPLICATIONS

This application is a national stage of International Application No. PCT/CN2018/109121, filed on Sep. 30, 2018, which claims priority to Chinese Patent Application No. 201711319500.1, filed on Dec. 12, 2017, entitled "Sorting Centre Goods Sorting Method and Apparatus, and Goods Sorting System," the contents of which are incorporated herein by reference in their entireties.

TECHNICAL FIELD

Embodiments of the present disclosure relate to the field of logistics technology, specifically to the field of goods sorting, and more specifically to a method and apparatus for sorting goods in a sorting center and a goods sorting system.

BACKGROUND

In a modern smart logistics system, smart logistics sorting, as a core constituent part of Industry 4.0, is an important link in the connection between supply and production.

An AGV (automated guided vehicle) is gradually becoming an important constituent part of the smart logistics due to its high efficiency, high reliability, high safety, and good safety and scalability.

In the existing AGV-based goods sorting system, goods are transported to a corresponding bag dropping opening using the AGV, thereby achieving the sorting for the goods for different destinations. Since each bag dropping opening is bound to a certain delivery station, and the delivery amount per unit time of each delivery station is different, the sorting amount per unit time of the each bag dropping opening is also different.

SUMMARY

An objective of embodiments of the present disclosure is to provide a method and apparatus for sorting goods in a sorting center and a goods sorting system.

In a first aspect, an embodiment of the present disclosure provides a method for sorting goods in a sorting center, the sorting center including a plurality of bag dropping openings distributed in a preset distribution mode and an automated guided vehicle for conveying goods to each of the bag dropping openings, the each of the bag dropping openings corresponding to a target delivery area, and the method including: determining a current position of each first bag dropping opening included in the sorting center, the first bag dropping opening being a bag dropping opening having a sorting amount per unit time exceeding a preset sorting amount in the sorting center; using the current position of the each first bag dropping opening as each current cluster center; performing a clustering operation on the each of the bag dropping openings in the sorting center; using, in response to a position of an actual cluster center of each cluster corresponding to the current position of the each first bag dropping opening, the current position of the each first bag dropping opening as a final position of the each first bag dropping opening; and conveying the goods to the each of the bag dropping openings in the sorting center using the automated guided vehicle.

In some embodiments, the method further includes: using, in response to the position of the actual cluster center of the each cluster not corresponding to the current position of the each first bag dropping opening, the actual cluster center of the each cluster as the each current cluster center, and performing the clustering operation.

In some embodiments, the performing a clustering operation on the each of the bag dropping openings in the sorting center includes: clustering each second bag dropping opening in the sorting center to one of the each current cluster center, the second bag dropping opening being a bag dropping opening other than the first bag dropping opening in the sorting center; and determining, from a clustering result, the position of the actual cluster center of the each cluster.

In some embodiments, the clustering each second bag dropping opening in the sorting center to one of the each current cluster center includes: determining, for the each second bag dropping opening, a distance of the second bag dropping opening from the each current cluster center; and using the current cluster center having a closest distance from the second bag dropping opening as the cluster center of the cluster to which the second bag dropping opening belongs.

In some embodiments, the determining, from a clustering result, the position of the actual cluster center of the each cluster includes: determining a mean value of coordinate values of bag dropping openings included in the each cluster in a preset coordinate system; and using a position indicated by the mean value as the position of the actual cluster center of the each cluster.

In some embodiments, the method further includes: determining, in the cluster to which the each second bag dropping opening belongs, a distance of the each second bag dropping opening from the actual cluster center of the cluster based on a sorting amount per unit time of the each second bag dropping opening.

In a second aspect, an embodiment of the present disclosure further provides an apparatus for sorting goods in a sorting center, the sorting center including a plurality of bag dropping openings distributed in a preset distribution mode and an automated guided vehicle for conveying goods to each of the bag dropping openings, the each of the bag dropping openings corresponding to a target delivery area, and the apparatus including: a current position determining unit, configured to determine a current position of each first bag dropping opening included in the sorting center, the first bag dropping opening being a bag dropping opening having a sorting amount per unit time exceeding a preset sorting amount in the sorting center; a center determining unit, configured to use the current position of the each first bag dropping opening as each current cluster center; a clustering unit, configured to perform a clustering operation on the each of the bag dropping openings in the sorting center; a final position determining unit, configured to use, in response to a position of an actual cluster center of each cluster corresponding to the current position of the each first bag dropping opening, the current position of the each first bag dropping opening as a final position of the each first bag dropping opening; and a conveying unit, configured to convey the goods to the each of the bag dropping openings in the sorting center using the automated guided vehicle.

In some embodiments, the final position determining unit is further configured to: use, in response to the position of the actual cluster center of the each cluster not corresponding to the current position of the each first bag dropping opening, the actual cluster center of the each cluster as the each current cluster center, and perform the clustering operation using the clustering unit.

In some embodiments, the clustering unit further includes: a current clustering subunit, configured to cluster each second bag dropping opening in the sorting center to one of the each current cluster center, the second bag dropping opening being a bag dropping opening other than the first bag dropping opening in the sorting center; and a position determining subunit, configured to determine, from a clustering result, the position of the actual cluster center of the each cluster.

In some embodiments, the current clustering subunit is further configured to: determine, for the each second bag dropping opening, a distance of the second bag dropping opening from the each current cluster center; and use the current cluster center having a closest distance from the second bag dropping opening as the cluster center of the cluster to which the second bag dropping opening belongs.

In some embodiments, the position determining subunit is further configured to: determine a mean value of coordinate values of bag dropping openings included in the each cluster in a preset coordinate system; and use a position indicated by the mean value as the position of the actual cluster center of the each cluster.

In some embodiments, the apparatus further includes: a second position determining unit, configured to determine, in the cluster to which the each second bag dropping opening belongs, a distance of the each second bag dropping opening from the actual cluster center of the cluster based on a sorting amount per unit time of the each second bag dropping opening.

In a third aspect, an embodiment of the present disclosure further provides a goods sorting system, including: a plurality of bag dropping openings distributed in a preset distribution mode, each of the bag dropping openings corresponding to a target delivery area; and a plurality of automated guided vehicles, each of the plurality of automated guided vehicles being configured to convey goods to one of the bag dropping openings based on the above method.

In a fourth aspect, an embodiment of the present disclosure further provides a device, including: one or more processors; and a storage apparatus, for storing one or more programs, where the one or more programs, when executed by the one or more processors, cause the one or more processors to implement any one of the above method.

In a fifth aspect, an embodiment of the present disclosure further provides a computer readable storage medium, storing a computer program thereon, where the computer program, when executed by a processor, implements any one of the above method.

According to the method and apparatus for sorting goods in a sorting center provided in embodiments of the present disclosure, the bag dropping openings in the sorting center are clustered by using the first bag dropping opening having the sorting amount per unit time greater than the preset sorting amount as the current cluster center, and the current position of the each first bag dropping opening is used as the final position of the each first bag dropping opening when the position of the actual cluster center of the each cluster corresponds to the current position of the each first bag dropping opening, thereby implementing the dispersed arrangement for the first bag dropping openings in the sorting center. Using the AGV to transport the goods to each of the bag dropping openings in the sorting center is conductive to alleviating the local congestion of the AGV, and then to improving the sorting efficiency.

BRIEF DESCRIPTION OF THE DRAWINGS

After reading detailed descriptions of non-limiting embodiments given with reference to the following accompanying drawings, other features, objectives and advantages of the present disclosure will be more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
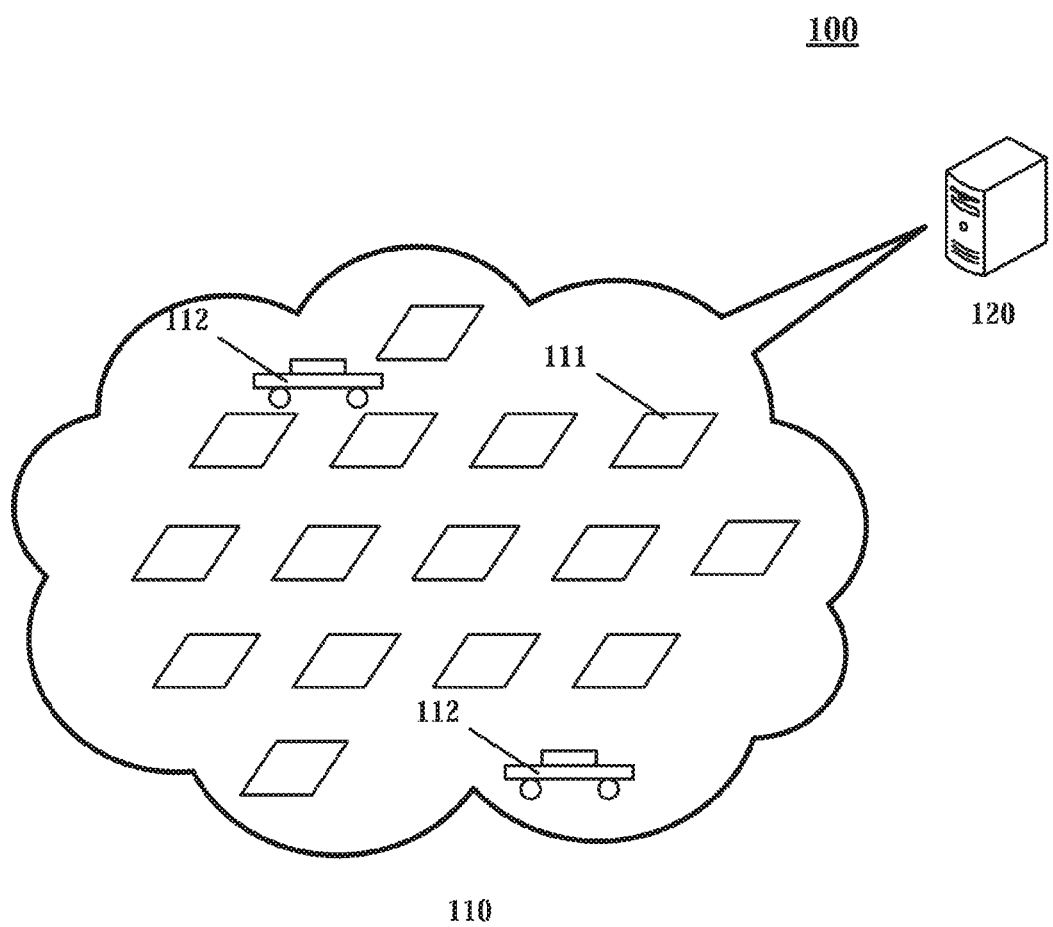
FIG. 1 is a diagram of an example system architecture in which embodiments of the present disclosure may be implemented.

FIG. 1 shows an example system architecture 100 in which a method for sorting goods in a sorting center or an apparatus for sorting goods in a sorting center according to embodiments of the present disclosure may be implemented.

As shown in FIG. 1, the system architecture 100 may include a sorting center 110, a network (not shown in the drawing) and a server 120. The sorting center 110 includes a plurality of bag dropping openings 111 and a plurality of AGVs 112. The bag dropping openings 111 may correspond to a certain delivery area. For example, the sorting center 110 may include three bag dropping openings corresponding to the delivery area Haidian District, Beijing City, one bag dropping opening corresponding to the delivery area Changping District, Beijing City, five bag dropping openings corresponding to the delivery area Chaoyang District, Beijing City, and the like. The AGVs 112 are used to transport goods to one of the bag dropping openings, where the delivery destination of the goods is subordinate to the delivery area corresponding to this bag dropping opening.

The network may serve as a medium providing a communication link between the AGVs 112 and the server 120. The network may include various types of connections, for example, wired or wireless communication links, or optical fiber cables.

The AGVs 112 may interact with the server 120 via the network 104 to receive or send a message, etc. For example, the AGVs 112 may send the identifier information of the currently carried goods (e.g., the delivery destination information of the goods, the weight information of the goods and the volume information of the goods) to the server 120. Thus, the server 120 generates a transport instruction based on the received identifier information, and sends the generated transport instruction to the AGVs 112 via the network. For example, the transport instruction may be used to indicate a transport path of the AGVs 112, a transport speed of the AGVs 112, the position of a bag dropping opening corresponding to a transport endpoint of the AGVs 112, and the like.

It should be noted that the method for sorting goods in a sorting center provided by embodiments of the present disclosure is generally performed by the server 120. Correspondingly, the apparatus for sorting goods in a sorting center is generally provided in the server 120.

It should be appreciated that the numbers of the sorting centers 110, the networks and the servers 120 in FIG. 1 are merely illustrative. Any number of sorting centers 110, networks and servers 120 may be provided based on actual requirements.

Figure 2:
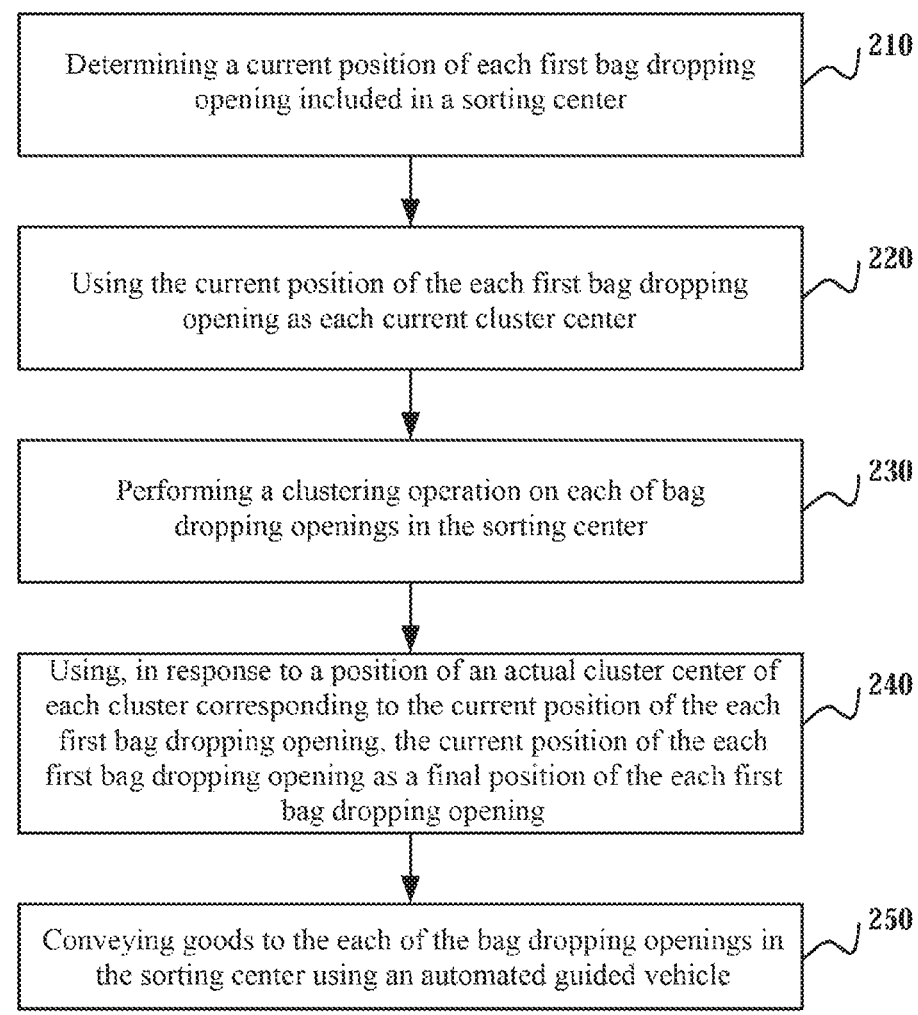
FIG. 2 is a flowchart of a method for sorting goods in a sorting center according to an embodiment of the present disclosure.

Further referring to FIG. 2, FIG. 2 illustrates a flow 200 of a method for sorting goods in a sorting center according to an embodiment of the present disclosure.

The sorting center includes a plurality of bag dropping openings distributed in a preset distribution mode and an AGV for conveying goods to each of the bag dropping openings. The AGV may shuttle back and forth between the goods storage area of the sorting center and each of the bag dropping openings, thereby conveying the goods in the goods storage area to a corresponding bag dropping opening. The each of the bag dropping openings correspond to a certain target delivery area, respectively.

In some application scenarios, delivery areas corresponding to the bag dropping openings in the same sorting center may, for example, belong to the same delivery district. That is, one delivery district may include a plurality of delivery areas adjacent to and/or partially intersecting with each other, and the goods for the delivery areas belonging to the delivery district may be sorted by the same sorting center and conveyed to the corresponding delivery areas.

Here, the distribution mode may be used to indicate the position information of each bag dropping opening included in the sorting center. The preset distribution mode may be a distribution mode preset according to a specific application scenario of the sorting center (e.g., including, but not limited to, an area of the distribution district corresponding to the sorting center and a delivery amount per unit time, and an area of the sorting center).

Figure 3A:
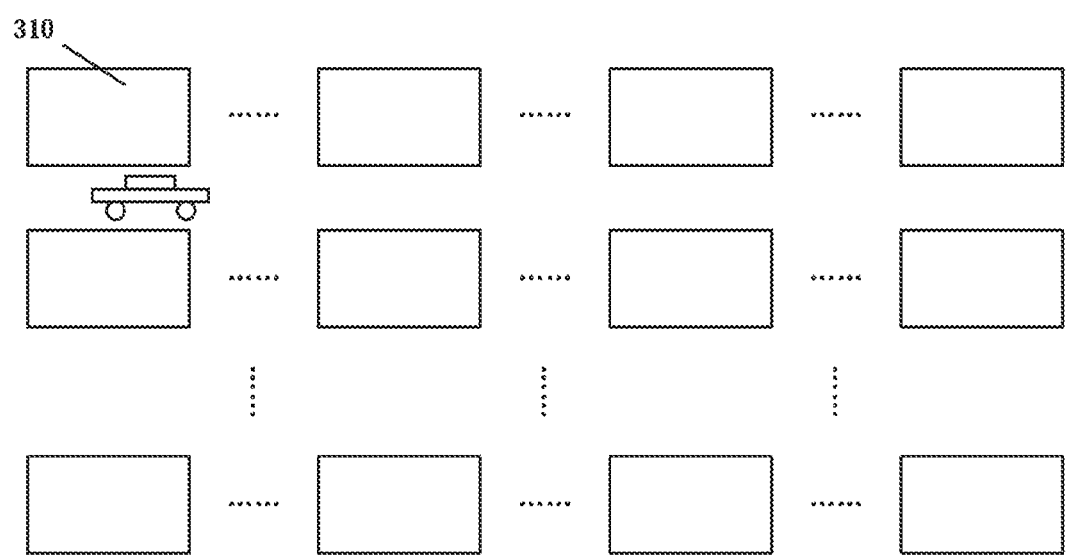
FIGS. 3A and 3B are schematic diagrams of two different distribution modes for bag dropping openings in the sorting center.

For example, in some application scenarios, as shown in FIG. 3A, the bag dropping openings 310 of the sorting center may be distributed in an array mode. In these application scenarios, each bag dropping opening may be served as an element in an array of M rows and N columns, and the spacing distance between adjacent bag dropping openings is a known distance value. In these application scenarios, the AGV may run in the space between the bag dropping openings, to transport the goods to the corresponding bag dropping opening.

Figure 3B:
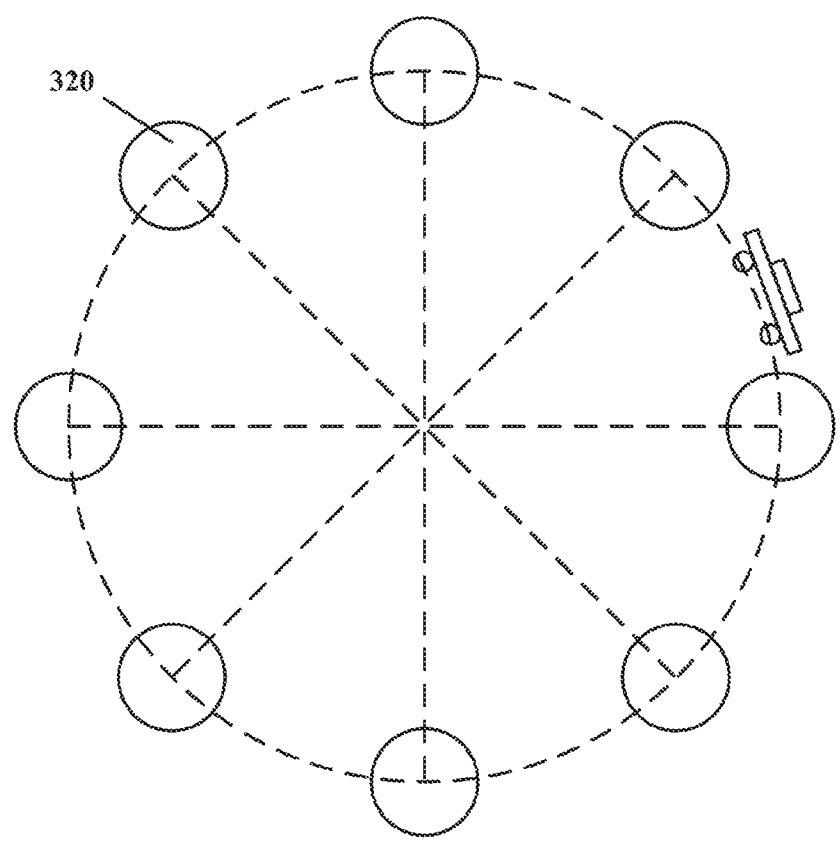

Alternatively, in other application scenarios, as shown in FIG. 3B, the bag dropping openings 320 of the sorting center may also be evenly distributed on a circumference at a preset interval. In these application scenarios, the AGV may run on the circumference to convey the goods to the corresponding bag dropping opening.

It should be noted that, regardless of the preset distribution mode in which the bag dropping openings of the sorting center are disposed, an electronic device (e.g., the server 120 in FIG. 1) on which the method for sorting goods in a sorting center according to this embodiment is applied may acquire the distribution mode for the bag dropping openings of the sorting center in real time or in advance.

The method for sorting goods in a sorting center according to an embodiment includes the following steps.

Step 210, determining a current position of each first bag dropping opening included in the sorting center, the first bag dropping opening being a bag dropping opening having a sorting amount per unit time exceeding a preset sorting amount, in the sorting center.

Since a bag dropping opening corresponds to a certain delivery area, and for some reason, the delivery amount per unit time of each delivery area is different, the sorting amount per unit time of each bag dropping opening is also different. For example, in some application scenarios, in the sorting center, the delivery area corresponding to a certain bag dropping opening A is an office building, and the delivery area corresponding to another bag dropping opening B is a residential area. Due to the difference in resident population in the two delivery areas and purchasing power thereof, the delivery amount per unit time of the delivery area corresponding to the bag dropping opening A and the delivery amount per unit time of the delivery area corresponding to the bag dropping opening B may be quite different. Correspondingly, the sorting amount per unit time of the bag dropping opening A and the sorting amount per unit time of the bag dropping opening B may also be quite different.

In some application scenarios, the sorting amounts of bag dropping openings corresponding to each delivery area within a period of time in the sorting center may be respectively counted, to obtain the sorting amount of each bag dropping opening within this period of time, and thus the sorting amount per unit time of each bag dropping opening may be determined.

In some application scenarios, for example, the each first bag dropping opening may be randomly distributed at a distribution position indicated by the preset distribution mode, to determine the current position of the each first bag dropping opening in the sorting center.

Step 220, using the current position of the each first bag dropping opening as each current cluster center.

Step 230, performing a clustering operation on each of bag dropping openings in the sorting center.

Here, the clustering algorithm applied in the clustering operation may be any kind of clustering algorithm used at present or to be developed in the future, including but not limited to, an agglomerative clustering algorithm (e.g., a CURE algorithm), a density-based clustering algorithm (e.g., a DBSCAN algorithm), a mesh-based clustering algorithm (e.g., a STING algorithm), a square error-based iterative redistribution clustering algorithm (e.g., a K-means algorithm), and the like.

Through the above steps 220 and 230, the bag dropping openings in the sorting center may be divided into a plurality of clusters, and the number of the clusters corresponds to the number of the first bag dropping openings.

For example, the sorting center includes three first bag dropping openings. By performing the above steps 220 and 230, the bag dropping openings of the sorting center may be divided into three clusters, and each bag dropping opening of the sorting center belongs to one of the clusters.

After step 230 is performed, the dividing on the bag dropping openings of the sorting center forms a plurality of groups (i.e., a plurality of clusters), and each cluster has an actual cluster center. Taking the K-means algorithm as an example, in each cluster obtained based on the K-means algorithm, the position of the cluster center may be determined based on the mean position value of the elements in the cluster.

Step 240, using, in response to a position of an actual cluster center of each cluster corresponding to the current position of the each first bag dropping opening, the current position of the each first bag dropping opening as a final position of the each first bag dropping opening.

Here, the position of the actual cluster center of the each cluster corresponds to the current position of the each first bag dropping opening. It may be understood that, in the each cluster, the distance between the position of a first bag dropping opening belonging to the cluster and the actual cluster center of the cluster is not greater than the distances between other elements in the cluster (i.e., other bag dropping openings in the cluster) and the actual cluster center of the cluster.

If the position of the actual cluster center of the each cluster corresponds to the current position of the each first bag dropping opening in the sorting center, it may be considered that the first bag dropping openings included in the sorting center are distributed as evenly as possible in the preset distribution mode of the sorting center.

Step 250, conveying goods to the each of the bag dropping openings in the sorting center using an automated guided vehicle.

For example, in some application scenarios, the electronic device on which the method for sorting goods in a sorting center according to this embodiment is applied may send a sorting command to the AGV to cause the AGV to convey the goods to the corresponding bag dropping opening.

According to the method for sorting goods in a sorting center of this embodiment, the bag dropping openings in the sorting center are clustered by using the first bag dropping opening having the sorting amount per unit time greater than the preset sorting amount as the current cluster center, and the current position of the each first bag dropping opening is used as the final position of the each first bag dropping opening when the position of the actual cluster center of the each cluster corresponds to the current position of the each first bag dropping opening, thereby implementing the dispersed arrangement for the first bag dropping openings in the sorting center. Using the AGV to transport the goods to the each bag dropping opening in the sorting center is conductive to alleviating the local congestion of the AGV, and then to improving the sorting efficiency.

In some alternative implementations, the method for sorting goods in a sorting center according to an embodiment may further include the following step.

Step 260, using, in response to the position of the actual cluster center of the each cluster not corresponding to the current position of the each first bag dropping opening, the actual cluster center as each current cluster center, and performing the clustering operation in step 230.

In this way, if the position of the actual cluster center of the each cluster does not correspond to the current position of the each first bag dropping opening, the final position of the each first bag dropping opening may be set to a position corresponding to the position of the actual cluster center of the each cluster through a loop iteration on step 230 and step 260, thereby implementing the dispersed arrangement for the first bag dropping openings in the sorting center, which is conductive to alleviating the local congestion that may be caused by the AGV in conveying the goods to the each bag dropping opening in the sorting center.

In some alternative implementations, in the method for sorting goods in a sorting center according to an embodiment, the performing a clustering operation on each bag dropping opening in the sorting center in step 230 may further include the following steps.

Step 231, clustering each second bag dropping opening in the sorting center to a current cluster center, the second bag dropping opening being a bag dropping opening other than the first bag dropping opening in the sorting center.

For example, for the each second bag dropping opening, the distance of the second bag dropping opening from the each current cluster center may first be determined. Next, a current cluster center having a closest distance from the second bag dropping opening is used as the cluster center of the cluster to which the second bag dropping opening belongs.

In some application scenarios, the Euclidean distance between the each second bag dropping opening and the each current cluster center may be used as an index to measure the distance between a second bag dropping opening and a current cluster center.

Step 232, determining, from a clustering result, the position of the actual cluster center of the each cluster.

In step 232, for example, a mean value of coordinate values of bag dropping openings included in the each cluster in a preset coordinate system may be first determined. Next, the position indicated by the mean value is used as the position of the actual cluster center of the cluster.

Here, the preset coordinate system may be associated with the distribution mode of the bag dropping openings in the sorting center.

For example, in some application scenarios, if the distribution mode of the bag dropping openings in the sorting center is the array distribution mode shown in FIG. 3A, the preset coordinate system may be, for example, a Cartesian coordinate system with a certain position as an origin, the row direction of the array as a horizontal axis and the column direction of the array as a vertical axis.

Alternatively, in other application scenarios, the distribution mode of the bag dropping openings in the sorting center is the distribution mode shown in FIG. 3B in which the bag dropping openings are evenly distributed on a circumference at a preset interval. In these application scenarios, the preset coordinate system may be, for example, a polar coordinate system with the center of a circle corresponding to the circumference as a pole and a ray passing through the pole and extending along a preset direction as a polar axis.

In some application scenarios, the position indicated by the mean value of the coordinate values the bag dropping openings included in the each cluster in the preset coordinate system may not be equivalent to the position of any one of the bag dropping openings in the preset distribution mode. In these application scenarios, the position of a bag dropping opening closest to the position indicated by the mean value of the coordinate values may be used as the position of the actual cluster center of the cluster.

The implementation of the method for sorting goods in a sorting center according to embodiments of the present disclosure will be further explained below in combination with FIGS. 4A and 4B, which makes the principles and the technical effects of the method of embodiments of the present disclosure more apparent.

Figure 4A:
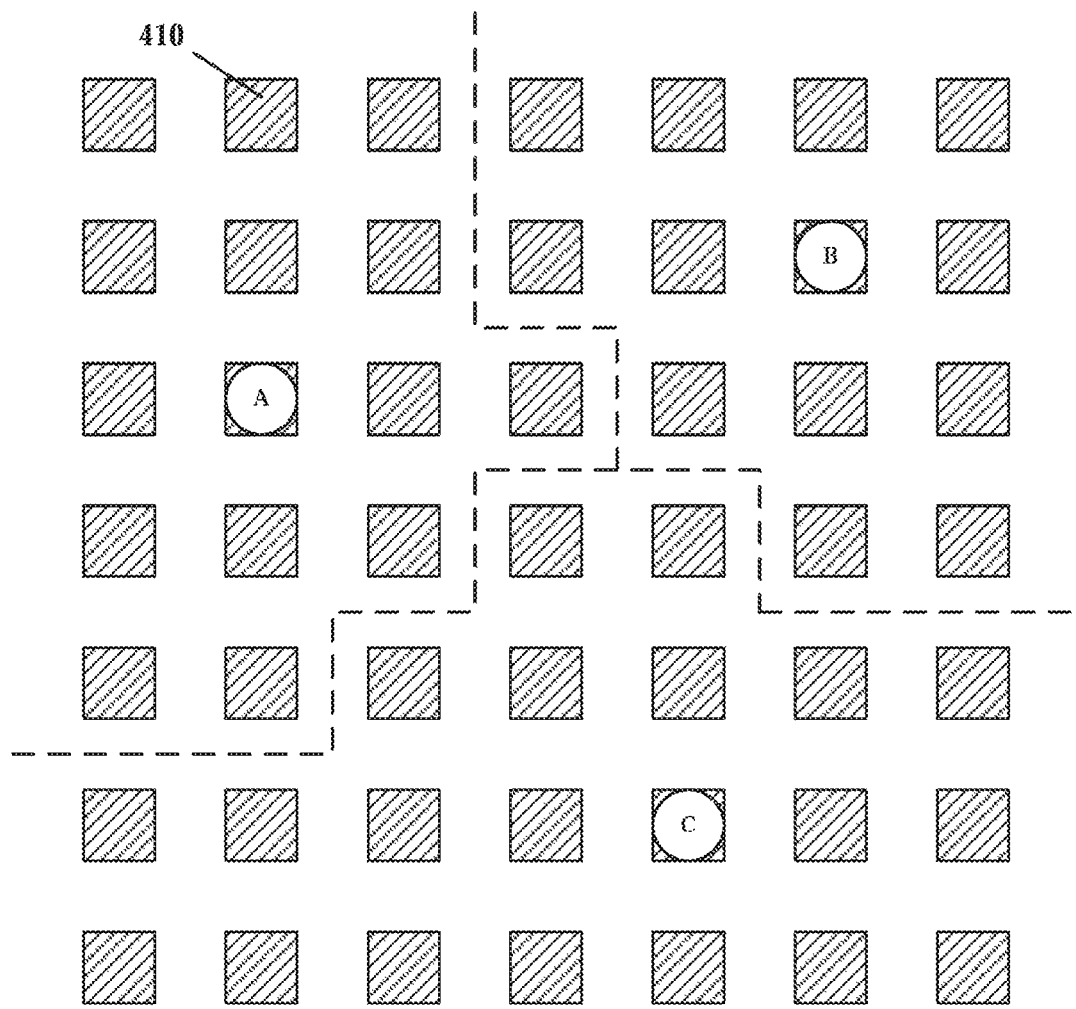
FIGS. 4A and 4B are schematic diagrams of an application scenario in which the method for sorting goods in a sorting center according to embodiments of the present disclosure is applied.
Figure 4B:
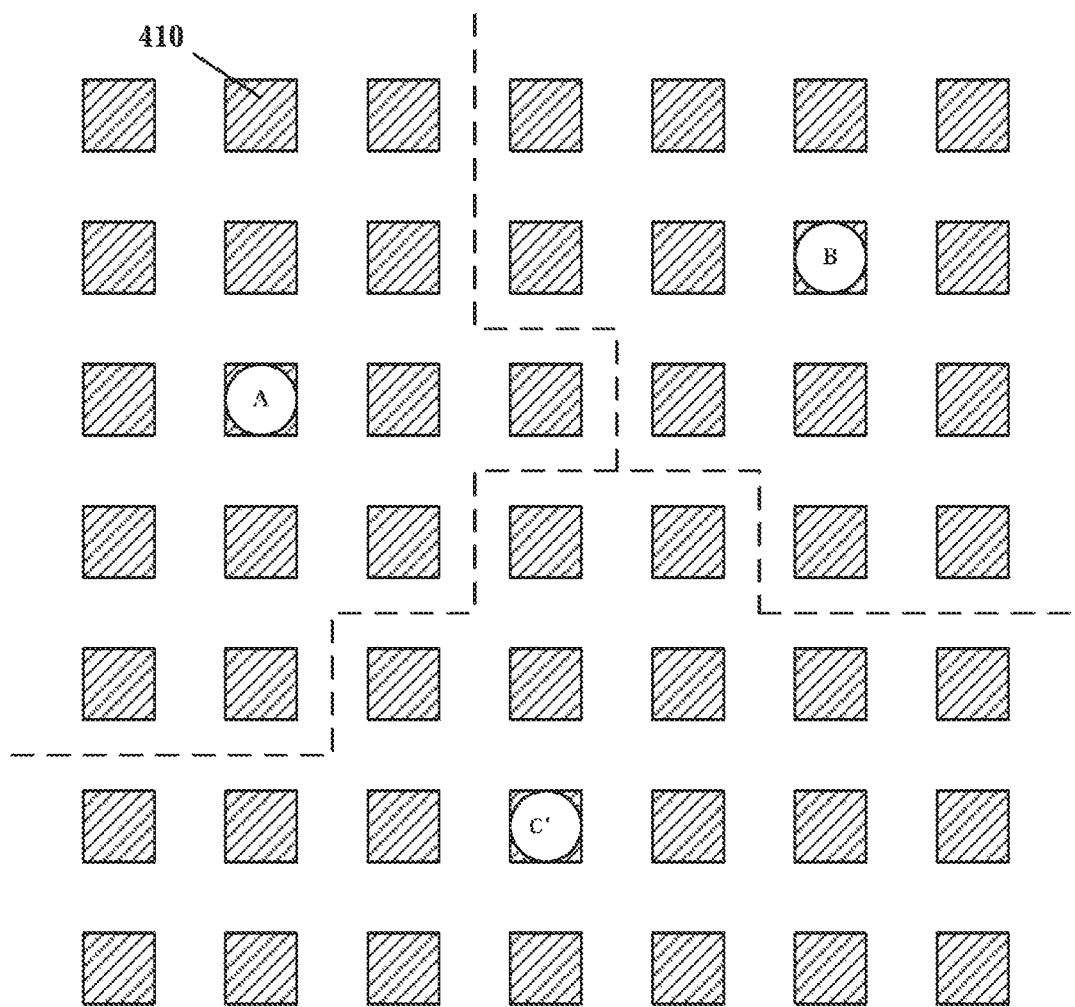

In the application scenario shown in FIGS. 4A and 4B, it is assumed that the sorting center includes 49 bag dropping openings 410, and includes three first bag dropping openings having a sorting amount per unit time exceeding a preset sorting amount threshold (e.g., 10000 pieces/hour). The bag dropping openings included in the sorting center are distributed in an array of 7×7, and the spacing distances between arbitrary two bag dropping openings adjacent in the row or column direction of the array are equal.

First, as shown in FIG. 4A, the current positions of the first bag dropping openings A-C are determined. As can be seen from FIG. 4A, the current position of the first bag dropping opening A is [3, 2] (i.e., the position of the third row and the second column in the 7×7 array). Similarly, the current position of the first bag dropping opening B is [2, 6], and the current position of the first bag dropping opening C is [6, 5].

After the bag dropping openings are clustered with [3, 2], [2, 6], and [6, 5] as the cluster centers, the bag dropping openings in the sorting center may be divided into three clusters, corresponding to the three areas divided by the dotted lines in FIG. 4A, respectively.

Next, the actual cluster centers of the three clusters are determined.

By obtaining the mean value of the coordinate values of the bag dropping openings in the each cluster, it may be determined that [3, 2] and [2, 6] are respectively the actual cluster centers of the clusters to which [3, 2] and [2, 6] belong, and the actual cluster center of the cluster to which [6, 5] belongs is [6, 4]. Here, since the bag dropping openings are distributed in the array, and the spacing distances between arbitrary two bag dropping openings adjacent in the row direction or the column direction of the array are equal, the position of each bag dropping opening in the array may be used as the coordinate values of the bag dropping opening. For example, for the bag dropping opening [6, 5], 6 may be considered as the coordinate value of the bag dropping opening on the vertical axis, and 5 may be considered as the coordinate value of the bag dropping opening on the horizontal axis.

Next, the bag dropping openings are clustered with [3, 2], [2, 6] and [6, 4] as the cluster centers, and the obtained clustering result is as shown in FIG. 4B.

By obtaining the mean value of the coordinate values of the bag dropping openings in the each cluster, it may be determined that [3, 2], [2, 6] and [6, 4] are respectively the actual cluster centers of the clusters to which [3, 2], [2, 6] and [6, 4] belong. In this way, [3, 2], [2, 6] and [6, 4] may be respectively used as the final positions of the first bag dropping openings in the sorting center.

After the final positions of the first bag dropping openings are determined, the goods may be conveyed to the bag dropping openings of the sorting center using the AGV. Since the positions of the first bag dropping openings in the sorting center are reasonably distributed, it is conductive to alleviating the local congestion of the AGV and then to improving the sorting efficiency, when the goods are transported to the bag dropping openings of the sorting center using the AGV.

Furthermore, in some alternative implementations of the method for sorting goods in a sorting center of embodiments of the present disclosure, the method for sorting goods in a sorting center may further include the following step.

A distance of the each second bag dropping opening from an actual cluster center of the cluster in the cluster to which the each second bag dropping opening belongs is determined based on a sorting amount per unit time of the each second bag dropping opening.

For example, the position of each second bag dropping opening belonging to the same cluster may be determined according to the sorting amount per unit time, such that the distance between any second bag dropping opening in the cluster and the actual cluster center of the cluster is not less than the distances between other second bag dropping openings having a sorting amount per unit time less than that of this second bag dropping opening and the actual cluster center of the cluster.

In this way, according to the sorting amount per unit time, the positions of the second bag dropping openings in the each cluster may be further reasonably dispersed distributed, thereby further alleviating the local congestion phenomenon that may occur when the AGV transports the goods to each bag dropping opening in the sorting center.

It should be noted that, according to the method for sorting goods in a sorting center in various embodiments of the present disclosure, when determining the position of the each first bag dropping opening (and, in some alternative implementations, the position of the each second bag dropping opening) in the sorting center, if the position of the first bag dropping opening before the determination is inconsistent with the position of the first bag dropping opening after the determination, then after the determination, the electronic device (e.g., the server 120 in FIG. 1) on which the method for sorting goods in a sorting center in various embodiments of the present disclosure is applied may adjust the position of the first bag dropping opening by modifying the corresponding relationship between a bag dropping opening and a target delivery area, without really moving the first bag dropping opening from the original position to the determined position.

Specifically, the application scenario of FIGS. 4A and 4B is still taken as an example. It is assumed that, in FIG. 4A, the target delivery area of the first bag dropping opening C is a, and the target delivery area of the bag dropping opening [6, 4] is b. After the position of the first bag dropping opening is re-determined, the original position of the first bag dropping opening C changes into the first bag dropping opening C', and the new position of the first bag dropping opening changes into [6, 4]. At this point, it is only necessary to re-associate the bag dropping opening [6, 4] with the target delivery area a and associate the bag dropping opening [6, 5] with the target delivery area b, to realize the adjustment for the position of the first bag dropping opening.

Figure 5:
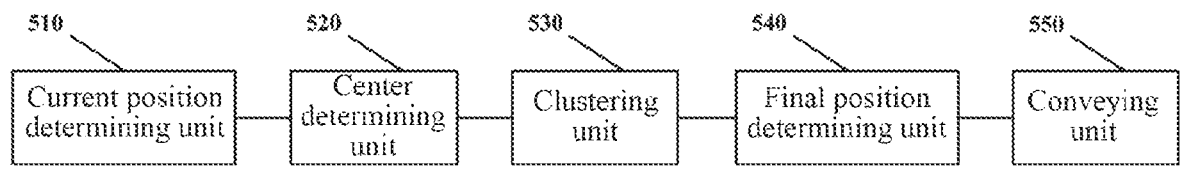
FIG. 5 is a schematic structural diagram of an apparatus for sorting goods in a sorting center according to an embodiment of the present disclosure.

Further referring to FIG. 5, as an implementation of the method shown in the above drawings, an embodiment of the present disclosure provides an apparatus for sorting goods in a sorting center. An embodiment of the apparatus corresponds to the embodiment of the method shown in FIG. 2, and the apparatus may be applied in various electronic devices.

The sorting center includes a plurality of bag dropping openings distributed in a preset distribution mode and an automated guided vehicle for conveying goods to each of the bag dropping openings, and the each of the bag dropping openings corresponds to a target delivery area.

As shown in FIG. 5, the apparatus 500 for sorting goods in a sorting center in this embodiment includes: a current position determining unit 510, a center determining unit 520, a clustering unit 530, a final position determining unit 540 and a conveying unit 550.

The current position determining unit 501 may be configured to determine a current position of each first bag dropping opening included in the sorting center. The first bag dropping opening is a bag dropping opening, having a sorting amount per unit time exceeding a preset sorting amount, in the sorting center.

The center determining unit 520 may be configured to use the current position of the each first bag dropping opening as each current cluster center.

The clustering unit 530 may be configured to perform a clustering operation on the each of the bag dropping openings in the sorting center.

The final position determining unit 530 may be configured to use, in response to a position of an actual cluster center of each cluster corresponding to the current position of the each first bag dropping opening, the current position of the each first bag dropping opening as a final position of the each first bag dropping opening.

The conveying unit 550 may be configured to convey the goods to the each of the bag dropping openings in the sorting center using the automated guided vehicle.

In some alternative implementations, the final position determining unit 540 may be further configured to: use, in response to the position of the actual cluster center of the each cluster not corresponding to the current position of the each first bag dropping opening, the actual cluster center of the each cluster as the each current cluster center, and perform the clustering operation using the clustering unit.

In some alternative implementations, the clustering unit 530 may further include: a current clustering subunit, configured to cluster each second bag dropping opening in the sorting center to one of the each current cluster center, the second bag dropping opening being a bag dropping opening other than the first bag dropping opening in the sorting center; and a position determining subunit, configured to determine, from a clustering result, the position of the actual cluster center of the each cluster.

In some alternative implementations, the current clustering subunit may be further configured to: determine, for the each second bag dropping opening, a distance of the second bag dropping opening from the each current cluster center; and use the current cluster center having a closest distance from the second bag dropping opening as the cluster center of the cluster to which the second bag dropping opening belongs.

In some alternative implementations, the position determining subunit may be further configured to: determine a mean value of coordinate values of bag dropping openings included in the each cluster in a preset coordinate system; and use a position indicated by the mean value as the position of the actual cluster center of the each cluster.

In some alternative implementations, the apparatus for sorting goods in a sorting center in this embodiment may further include: a second position determining unit (not shown in the drawing), configured to determine, in the cluster to which the each second bag dropping opening belongs, a distance of the each second bag dropping opening from the actual cluster center of the cluster based on a sorting amount per unit time of the each second bag dropping opening.

In addition, the present disclosure further discloses a goods sorting system. The goods sorting system includes a plurality of bag dropping openings distributed in a preset distribution mode and a plurality of automated guided vehicles.

Here, each of the bag dropping openings corresponds to a target delivery area. Each of the automated guided vehicles is configured to convey goods to one of the bag dropping openings based on the method for sorting goods in a sorting center as described above.

Figure 6:
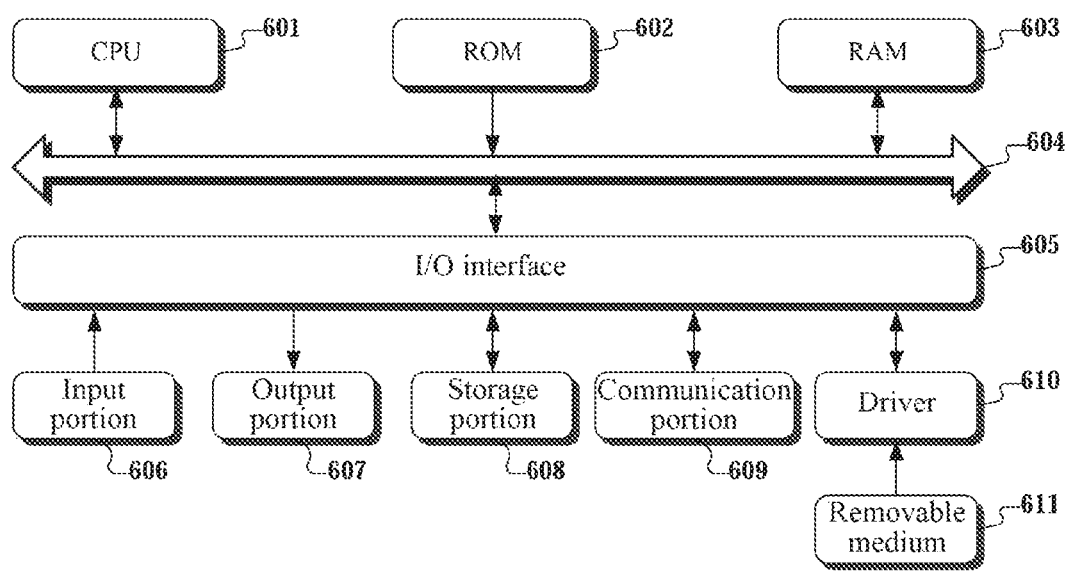
FIG. 6 is a schematic structural diagram of a computer system adapted to implement a terminal device or a server according to embodiments of the present disclosure.

Referring to FIG. 6, FIG. 6 is a schematic structural diagram of a computer system 600 adapted to implement a server of embodiments of the present disclosure. The server shown in FIG. 6 is merely an example, and should not bring any limitations to the functions and the scope of use of embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse, etc.; an output portion 607 including a cathode ray tube (CRT), a liquid crystal display device (LCD), a speaker, etc.; a storage portion 608 including a hard disk and the like; and a communication portion 609 including a network interface card such as a LAN (local area network) card and a modem. The communication portion 609 performs communication processes via a network such as the Internet. A driver 610 is also connected to the I/O interface 605 as required. A removable medium 611 such as a magnetic disk, an optical disk, a magneto-optical disk, and a semiconductor memory may be installed on the driver 610, to facilitate the retrieval of a computer program from the removable medium 611, and the installation thereof on the storage portion 608 as needed.

In particular, according to some embodiments of the present disclosure, the process described above with reference to the flow chart may be implemented in a computer software program. For example, some embodiments of the present disclosure include a computer program product, which includes a computer program that is tangibly embedded in a computer readable medium. The computer program includes program codes for executing the method as shown in the flow chart. In such an embodiment, the computer program may be downloaded and installed from a network via the communication portion 609, and/or be installed from the removable medium 611. The computer program, when executed by the central processing unit (CPU) 601, implements the above functions as defined by the method of some embodiments of the present disclosure. It should be noted that the computer readable medium according to some embodiments of the present disclosure may be a computer readable signal medium or a computer readable medium or any combination of the above two. An example of the computer readable medium may include, but is not limited to: electric, magnetic, optical, electromagnetic, infrared, or semiconductor systems, apparatuses, elements, or a combination of any of the above. A more specific example of the computer readable medium may include, but is not limited to: electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In some embodiments of the present disclosure, the computer readable medium may be any tangible medium containing or storing programs, which may be used by, or used in combination with, a command execution system, apparatus or element. In some embodiments of the present disclosure, the computer readable signal medium may include a data signal in the base band or propagating as a part of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable medium. The computer readable medium is capable of transmitting, propagating or transferring programs for use by, or used in combination with, a command execution system, apparatus or element. The program codes contained on the computer readable medium may be transmitted with any suitable medium, including but not limited to: wireless, wired, optical cable, RF medium, etc., or any suitable combination of the above.

A computer program code for executing operations in the disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flowcharts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logical functions. It should be further noted that, in some alternative implementations, the functions denoted by the blocks may also occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in embodiments of the present disclosure may be implemented by means of software or hardware. The described units may also be provided in a processor. For example, the processor may be described as: a processor including a current position determining unit, a center determining unit, a clustering unit, a final position determining unit and a conveying unit. The names of these units do not in some cases constitute a limitation to such units themselves. For example, the current position determining unit may alternatively be described as "a unit for determining a current position of each first bag dropping opening included in the sorting center."

In another aspect, embodiments of the present disclosure further provide a computer readable medium. The computer readable medium may be the computer readable medium included in the apparatus described in the above embodiments, or a stand-alone computer readable medium not assembled into the apparatus. The computer readable medium carries one or more programs. The one or more programs, when executed by the apparatus, cause the apparatus to: determine a current position of each first bag dropping opening included in a sorting center, the first bag dropping opening being a bag dropping opening having a sorting amount per unit time exceeding a preset sorting amount in the sorting center; use the current position of the each first bag dropping opening as each current cluster center; perform a clustering operation on the each of the bag dropping openings in the sorting center; use, in response to a position of an actual cluster center of each cluster corresponding to the current position of the each first bag dropping opening, the current position of the each first bag dropping opening as a final position of the each first bag dropping opening; and convey goods to the each of the bag dropping openings in the sorting center using an automated guided vehicle.

The above description only provides an explanation of embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features referring to interchanged with, but not limited to, technical features with similar functions disclosed in the present disclosure are examples.

What is claimed is:

1. A method for sorting goods in a sorting center, the sorting center comprising a plurality of workstations in the sorting center distributed in a preset distribution mode and an automated guided vehicle for conveying goods to each of the workstations, the each of the workstations corresponding to a target delivery area, and the method comprising:
    acquiring a current position of a first workstation included in the sorting center, the first workstation being a workstation having an amount of sorting goods per unit time exceeding a preset sorting amount in the sorting center;
    using the current position of the each first workstation as each current cluster center;
    performing an operation of clustering on the workstations in the sorting center;
    using, in response to a position of an actual center of cluster corresponding to each cluster corresponding to the current position of the each first workstation, the current position of the each first workstation as a final position of the each first workstation; and
    conveying the goods to the each of the workstations in the sorting center using the automated guided vehicle.

2. The method according to claim 1, further comprising:
using, in response to the position of the actual center of cluster corresponding to the each cluster not corresponding to the current position of the each first workstation, the actual center of cluster corresponding to the each cluster as the each current cluster center, and performing the clustering operation.

3. The method according to claim 1, wherein the performing an operation of clustering on the workstations in the sorting center comprises:
clustering a second workstation in the sorting center to one of the each current cluster center, the second workstation being a workstation other than the first workstation in the sorting center; and
determining, from a clustering result, the position of the actual center of cluster corresponding to the each cluster.

4. The method according to claim 3, wherein the clustering each second workstation in the sorting center to one of the each current cluster center comprises:
determining, for the each second workstation, a distance of the second workstation from the each current cluster center; and
using the current cluster center having a closest distance from the second workstation as the cluster center of the cluster to which the second workstation belongs.

5. The method according to claim 3, wherein the determining, from a clustering result, the position of the actual center of cluster corresponding to the each cluster comprises:
determining a mean value of coordinate values of workstations included in the each cluster in a preset coordinate system; and
using a position indicated by the mean value as the position of the actual center of cluster corresponding to the each cluster.

6. The method according to claim 3, further comprising:
determining, in the cluster to which the each second workstation belongs, a distance of the each second workstation from the actual center of cluster corresponding to the cluster based on an amount of sorting goods per unit time of the each second workstation.

7. An apparatus for sorting goods in a sorting center, the sorting center comprising a plurality of workstations distributed in a preset distribution mode and an automated guided vehicle for conveying goods to each of the workstations, the each of the workstations corresponding to a target delivery area, and the apparatus comprising:
at least one processor; and
a memory storing instructions, the instructions when executed by the at least one processor, cause the at least one processor to perform operations, the operations comprising:
acquiring a current position of each first workstation included in the sorting center, the first workstation being a workstation having an amount of sorting goods per unit time exceeding a preset sorting amount in the sorting center;
using the current position of the each first workstation as each current cluster center;
performing an operation of clustering on the workstation in the sorting center;
using, in response to a position of an actual center cluster corresponding to of each cluster corresponding to the current position of the a first workstation, the current position of the each first workstation as a final position of the each first workstation; and
conveying the goods to the each of the workstations in the sorting center using the automated guided vehicle.

8. The apparatus according to claim 7, wherein the operations further comprise:
using, in response to the position of the actual center of cluster corresponding to the each cluster not corresponding to the current position of the each first workstation, the actual center of cluster corresponding to the each cluster as the each current cluster center, and performing the operation of clustering using the clustering unit.

9. The apparatus according to claim 7, wherein the performing an operation of clustering on the workstations in the sorting center comprises:
clustering a second workstation in the sorting center to one of the each current cluster center, the second workstation being a workstation other than the first bag dropping opening in the sorting center; and
determining, from a clustering result, the position of the actual center of cluster corresponding to the each cluster.

10. The apparatus according to claim 9, wherein the clustering each second workstation in the sorting center to one of the each current cluster center comprises:
determining, for the each second workstation, a distance of the second workstation from the each current cluster center; and
using the current cluster center having a closest distance from the second workstation as the cluster center of the cluster to which the second workstation belongs.

11. The apparatus according to claim 9, wherein the determining, from a clustering result, the position of the actual center of cluster corresponding to the each cluster comprises:
determining a mean value of coordinate values of workstations included in the each cluster in a preset coordinate system; and
using a position indicated by the mean value as the position of the actual center of cluster corresponding to the each cluster.

12. The apparatus according to claim 9, the operations further comprising:
determining, in the cluster to which the each second workstation belongs, a distance of the each second workstation from the actual center of cluster corresponding to the cluster based on an amount of sorting goods per unit time of the each second workstation.

13. A non-transitory computer readable storage medium for sorting goods in a sorting center, the sorting center comprising a plurality of workstations distributed in a preset distribution mode and an automated guided vehicle for conveying goods to each of the workstations, the each of the workstations corresponding to a target delivery area, the computer readable storage medium storing a computer program thereon, wherein the program, when executed by a processor, causes the processor to perform operations, the operations comprising:
acquiring a current position of each first workstation included in the sorting center, the first workstation being a workstation having an amount of sorting goods per unit time exceeding a preset sorting amount in the sorting center;
using the current position of the each first workstation as each current cluster center;
performing an operation of clustering on the workstations in the sorting center;

using, in response to a position of an actual center of cluster corresponding to each cluster corresponding to the current position of the each first workstation, the current position of the each first workstation as a final position of the each first workstation; and conveying the goods to the each of the workstations in the sorting center using the automated guided vehicle.

14. The non-transitory computer readable storage medium according to claim 13, wherein the operations further comprise:

using, in response to the position of the actual center of cluster corresponding to the each cluster not corresponding to the current position of the each first workstation, the actual center of cluster corresponding to the each cluster as the each current cluster center, and performing the operation of clustering using the clustering unit.

15. The non-transitory computer readable storage medium according to claim 13, wherein the performing an operation of clustering on the workstations in the sorting center comprises:

clustering a second workstation in the sorting center to one of the each current cluster center, the second workstation being a workstation other than the first workstation in the sorting center; and determining, from a clustering result, the position of the actual center of cluster corresponding to the each cluster.

16. The non-transitory computer readable storage medium according to claim 15, wherein the clustering each second workstation in the sorting center to one of the each current cluster center comprises:

determining, for the each second workstation, a distance of the second workstation from the each current cluster center; and using the current cluster center having a closest distance from the second workstation as the cluster center of the cluster to which the second workstation belongs.

17. The non-transitory computer readable storage medium according to claim 15, wherein the determining, from a clustering result, the position of the actual center of cluster corresponding to the each cluster comprises:

determining a mean value of coordinate values of workstations included in the each cluster in a preset coordinate system; and using a position indicated by the mean value as the position of the actual center of cluster corresponding to the each cluster.

18. The non-transitory computer readable storage medium according to claim 15, the operations further comprising:

determining, in the cluster to which the each second workstation belongs, a distance of the each second workstation from the actual center of cluster corresponding to the cluster based on an amount of sorting goods per unit time of the each second workstation.

* * * * *